May 6, 1930.  F. H. HARM  1,757,799
ICE CREAM FORM DEVICE
Filed June 19, 1929
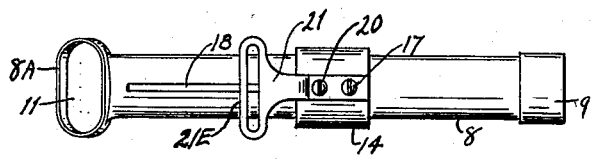
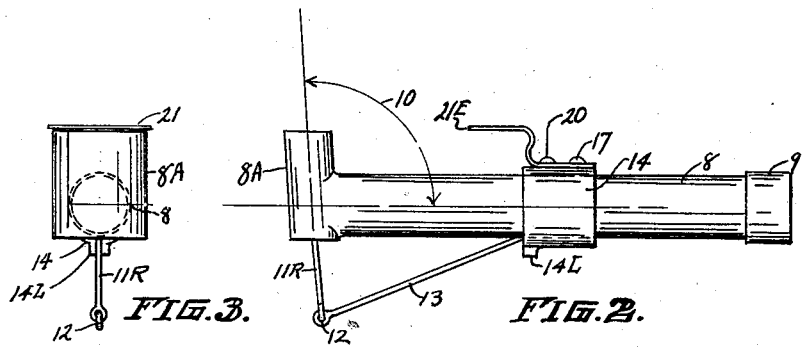
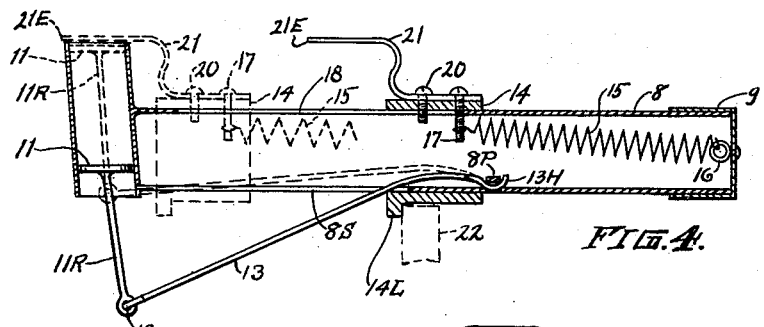
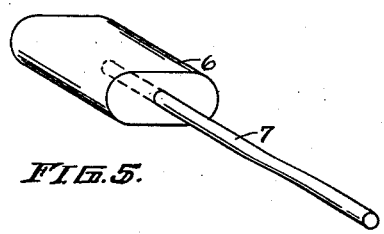
INVENTOR:
Frederick H. Harm
BY David E. Carlsen
ATTORNEY.

Patented May 6, 1930

1,757,799

UNITED STATES PATENT OFFICE

FREDERICK H. HARM, OF LE SUEUR CENTER, MINNESOTA

ICE-CREAM-FORM DEVICE

Application filed June 19, 1929. Serial No. 371,969.

This invention relates to a dispensing device particularly used by store-keepers or individuals for forming a quantity of ice-cream in a predetermined portion mounted on a holder and thus ready to be consumed. The main object is to provide a simple, highly efficient, sanitary and inexpensive device for the purpose above stated, and a further object is to provide a dispensing device with improved features and construction over a device for the same purpose and for which a United States patent application has been filed, Serial Number, 365,295 filed May 23, 1929.

A feature of my device is that its construction and use are such that the storekeeper or other user may dispense any number of exact measured portions of ice-cream or like edible without coming in contact with the edible substance, all as hereinafter fully set forth and as illustrated in the accompanying drawing, in which,—

Fig. 1 is a top view of my improved ice-cream dispensing device.

Fig. 2 is a side elevation of Fig. 1, and Fig. 3 is a front end elevation of Fig. 2.

Fig. 4 is an enlarged longitudinal sectional taken approximately on a vertical central line through the device.

Fig. 5 is a perspective view of a portion of ice-cream as produced by my device and a stick therein serving as a handle while the edible part is being consumed.

Referring to the drawing by reference numerals, my device is designed with the object in view of producing a portion of ice cream of predetermined size and shape and in which is insertible a stick to hold the ice-cream, said product being popularly known as an ice-cream "lollypop" corresponding to candy products designated by the same name. In Fig. 5 the ice-cream portion is designated 6 and the stick 7, and said piece or portion of ice-cream is preferably elongated as shown and of elliptic form in cross section, though it may be of other form.

My device comprises an elongated tubular handle 8 and is provided at its rear end with a removable cap 9. At its front end is suitably fixed a tubular scoop device comprising a metal tube 8A fixed to 8 in an obtuse angular position to the latter, with reference to the center lines of both, as indicated by the arc 10 Fig. 2. The member 8A will hereinafter be designated as the scoop, 11 is a plunger or piston reciprocable within said scoop and has a rod 11R extending downwardly and out of the lower end of the scoop, the lower end of said rod being pivotally connected at 12 to a plunger actuating rod 13 extending longitudinally under the main tube and said rod extending angularly, longitudinally of, and at the under side of the handle through a slit 8S and terminating within the tube in the form of a pivot hook 13H engaging a pivot bar 8P formed integrally of the tube 8 by punching and offsetting inwardly a position of said tube (see Fig. 4). The slit 8S is of course forward of member 8P and the actuating rod is oscillatable therein as from full to dotted line positions in Fig. 4 to reciprocate the plunger 11 in the scoop 8A, said oscillation of bar 13 being caused by a reciprocable collar 14 on the handle 8.

This collar is rearward of the part of rod 13 projecting from the tube and when said collar is moved forward toward the scoop, rod 13 is forced upward and imparts movement of plunger 11 upward toward opening of scoop 8A for a purpose to be described. 15 is a tension coil spring interiorly of tube 8 and in tension between a hook member 16 on cap 9 and an inwardly projecting screw 17 in collar 14, thus holding the collar 14 normally retracted, toward the rear end of the device and permitting bar 13 to assume its lower position at which time the plunger 11 is near the lower open end of the scoop. The screw 17 in collar 14 projects thru and is guided in an elongated top slot 18 in tube 8. Assuming collar 14 to be in retracted position shown in Fig. 4 the operator grasps the tube 8 rearward of said collar and holds the device upright with the scoop part forward and pushes said scoop through ice-cream in a freezer until the scoop is filled with ice-cream between the plunger and the top end of the scoop, the plunger being of course retracted as in lower position shown in Fig. 4. When the scoop has thus been filled a stick 7 is inserted in the ice-cream exposed at the open end of the scoop. Then the collar 14 is slid forward toward the scoop causing bar 13 to be moved upwardly and the plunger 11 to eject the ice-cream from the scoop. The design and proportions of the parts described are such that when the collar 14 is still a little distance from the end of its stroke the plunger has reached its uppermost position.

20 is a shearing blade fixed on top of collar 14 as with the screw 17 and another screw 2 also guided in slot 18, said blade having a cutting edge 20E which passes over the upper end of the scoop and shears off any surplus ice-cream sticking to the rim or open end of the scoop just above the plunger and the ice-cream with the stick in it is severed from the device and ready to be consumed. Said shearing takes place of course only when the collar 14 has been pressed forward as far as possible, as to position shown dotted in Fig. 4. The ejection of ice-cream is facilitated by providing a lug 14L on the under side of collar 14 and which may be engaged on the upper inside rim part 22 (shown dotted in Fig. 4) of the ice-cream freezer or container. With this lug thus engaged and the scoop full of ice-cream the operator merely pulls the tube 8 rearwardly the collar remaining in said engaged position and forcing bar 13 up and directly imparting upward movement of plunger 11 which ejects the ice-cream from the scoop.

This device is an improvement in many respects over my other application, one advantage having been found to be the scooping action necessary to fill the tube 8A without packing the ice-cream too hard, and another advantage being that the scoop 8A can be used to better advantage in getting at all the ice-cream within a freezer when loading the scoop member.

It is obvious that the scoop member may be of other shapes, in cross section, as desired to produce an ice-cream piece of polygonal shape in cross section but I have shown only a preferred type, namely a plain piece 6 made by a tube of elliptic shape in cross section and a plunger of corresponding shape.

I claim:

1. A dispersing device for edibles of the class described comprising a tubular handle, a tubular scoop member fixed at the front end of said handle in angular relation to the latter, a removable cap closing the rear end of said handle, a reciprocable plunger in said scoop member and a plunger rod extending therefrom and outwardly of the scoop, a plunger actuating rod pivotally connected at its front end to the free end of said plunger rod and its rear end pivotally fixed within the tube and said actuating rod normally extending from said rear pivot in inclined plane forward and downward under said handle to the pivotal connection with the plunger rod, and reciprocable means on said handle for frictionally engaging said actuating rod to move the plunger toward an open end of the scoop member.

2. A dispensing device for edibles of the class described comprising a tubular handle, a tubular scoop member fixed at the front end of said handle in angular relation to the latter, a removable cap closing the rear end of said handle, a reciprocable plunger in said scoop member and a plunger rod extending therefrom and outwardly of the scoop, a plunger actuating rod pivotally connected at its front end to the free end of said plunger rod and its rear end pivotally fixed within the tube and said actuating rod normally extending from said rear pivot in inclined plane forward and downward under said handle to the pivotal connection with the plunger rod, and reciprocable means on said handle for frictionally engaging said actuating rod to move the plunger toward an open end of the scoop member, said plunger normally in retracted position near the lower end of the scoop when the actuating rod is in said inclined position for the purpose set forth, and shearing means mounted on said reciprocating member on the said reciprocable means of the handle adapted to pass over and close to the top end of said scoop when the plunger is actuated toward said end of the scoop.

3. The structure specified in claim 2, in which said reciprocable means on the handle consists of a collar, key means in said collar and a slot provided in said handle and slidably engaged by said key means to limit said reciprocable movement of the collar, a tension coil spring within the handle and normally in tension between and connected with said collar and a rear part of the handle to hold the collar normally in retracted position.

4. The structure specified in claim 2, in which said reciprocable means on the handle consists of a collar, key means in said collar and a slot provided in said handle and slidably engaged by said key means to limit said reciprocable movement of the collar, a tension coil spring within the handle and normally in tension between and connected with said collar and a rear part of the handle to hold the collar normally in retracted position, said shearing means comprising a blade fixed on said collar and having a forwardly directed cutting edge arranged in a plane to pass over the upper open end of the scoop.

In testimony whereof I affix my signature.

FREDERICK H. HARM.